Figure 1:
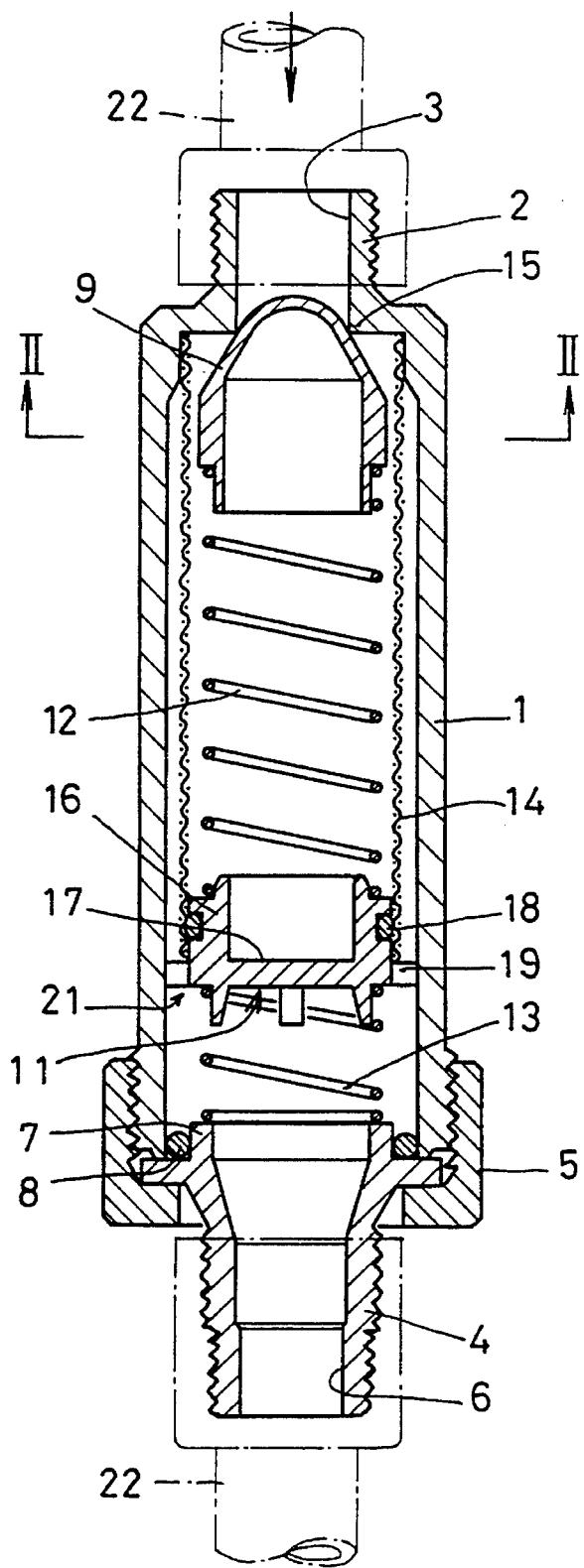

United States Patent [19]

Yamamoto

[11] Patent Number: 5,490,929
[45] Date of Patent: Feb. 13, 1996

[54] CLEANER FOR ATOMIZER

[75] Inventor: Kenzo Yamamoto, Wakayama, Japan

[73] Assignee: Yamaho Giken Kabushiki Kaisha, Wakayama, Japan

[21] Appl. No.: 266,483

[22] Filed: Jun. 27, 1994

[30] Foreign Application Priority Data

Jun. 30, 1993 [JP] Japan ................... 5-160678

[51] Int. Cl.⁶ ........................... B01D 24/40; B01D 29/17
[52] U.S. Cl. .................... 210/430; 210/448; 210/456
[58] Field of Search ............................ 210/409, 418, 210/429, 430, 431, 446, 448, 456

[56] References Cited

U.S. PATENT DOCUMENTS

| | | | |
|---|---|---|---|
| 1,994,656 | 3/1935 | Liddell | 210/430 |
| 2,793,752 | 5/1957 | Jay | 210/429 |
| 4,014,365 | 3/1977 | Peterson et al. | 210/430 |
| 4,018,686 | 4/1977 | Shufflebarger et al. | 210/448 |
| 4,024,065 | 5/1977 | Morgan, Jr. | 210/448 |
| 5,250,176 | 10/1993 | Daniel | 210/430 |

FOREIGN PATENT DOCUMENTS 2112295  7/1983  United Kingdom ............ 210/430

*Primary Examiner*—Neil McCarthy
*Attorney, Agent, or Firm*—Wenderoth, Lind & Ponack

[57] ABSTRACT

A cleaner for an atomizer for removing the dust by a rapid flow of the liquid. It comprises a cylindrical case having a valve body urged to a valve seat by a spring, and a cylindrical mesh filter fitted around the valve body and the spring. One end of the mesh filter is urged to the valve seat whereas the other end is supported by a spring seat. The rapid liquid flow collides the mesh filter, thereby removing the dust clogging in the mesh filter.

2 Claims, 2 Drawing Sheets

CLEANER FOR ATOMIZER

This invention relates to a dust-removing cleaner for an atomizer connected with a hose.

It is a known practice to provide a dust-removing cleaner connected with a hose which supplies a pharmaceutical liquid from an atomizer body to a nozzle hole (Examined Japanese Utility Model Publication No. 47-15703).

A conventional cleaner of this type comprises a cylindrical mesh filter mounted in a cylindrical case. The inlet side of the mesh filter is open with its outlet side closed.

With such a cleaner, the mesh filter gets clogged with a prolonged use. Thus, it had to be detached and cleaned up frequently.

Also, in order to close one end of the conventional mesh filter, it was necessary to reduce the diameter at the one end and connect the reduced end by brazing.

It is an object of the present invention to provide a cleaner for an atomizer having a mesh filter which is less likely to get clogged, and which is easy to manufacture by providing it a self-cleaning function.

According to the present invention, there is provided a cleaner for an atomizer comprising a case having an inlet at one end thereof and an outlet at the other end thereof, a conical valve body mounted in the case, a valve seat formed near the inlet, a spring accommodated in the case for urging the valve body against the valve seat, a mesh filter having both ends open and fitted around the valve body and the spring, a spring seat mounted in the case for supporting one end of the spring, the mesh filter having one end thereof abutting the valve seat and the other end blocked by the spring seat, the spring seat being formed with a liquid passage therearound so as to communicate with the outlet.

Also, the mesh filter should preferably be in the form of a cylinder with one end thereof fitted tightly around an O-ring which is mounted around the cylindrical portion of the spring seat.

The mesh filter may be in the form of a cylinder with its one end fitted around the outer periphery of the O-ring which is provided around the cylindrical portion of the spring seat.

The rapid liquid flow around the conical valve body accommodated in the case collides the mesh filter. Thus, the dust clogging the mesh filter can be removed and cleaned by the flow, thereby reducing the number of times to clean it up.

One end of the mesh filter is fitted around the O-ring mounted on the spring seat. Even if the mesh filter is distorted before it is mounted, it will be corrected to the circular shape after mounted.

Figure 2:
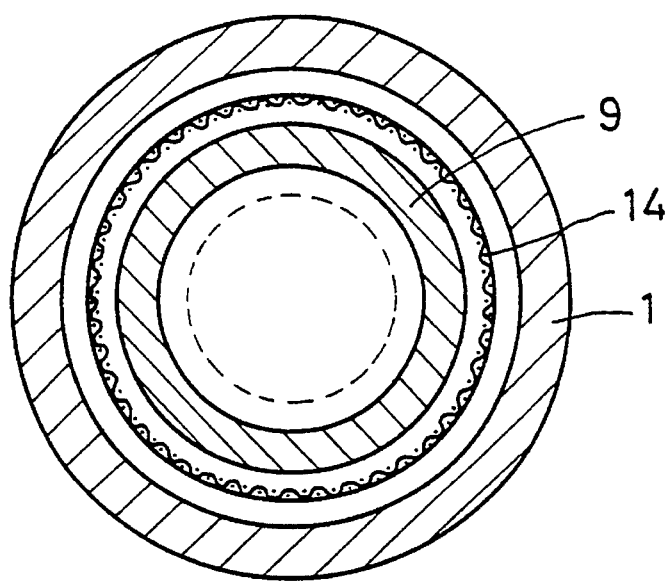
Figure 3:
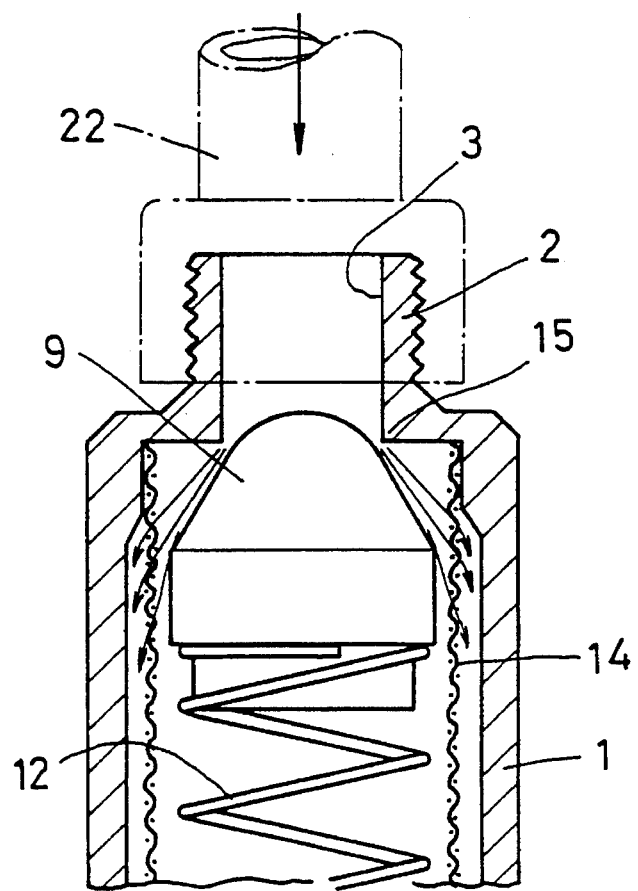

Other features and objects of the present invention will become apparent from the following description made with reference to the accompanying drawings, in which:

FIG. 1 is a sectional view of an embodiment;
FIG. 2 is a sectional view taken along line II—II of FIG. 1; and
FIG. 3 is a sectional view of a portion of the same while it allows a liquid to pass.

As shown in FIG. 1, a cleaner in this embodiment comprises a cylindrical case 1 made of plastic with a connecting portion 2 formed on one end thereof and having a smaller diameter. An inlet 3 is formed in the connecting portion 2 to introduce a liquid. A connecting member 4 is tightened on the other end of the case 1 by a union nut 5 and has an outlet 6 therein. Further, a spring seat 7 is formed on the inner end of the connecting member 4. An O-ring 8 is mounted between the spring seat 7 and the inner wall of the case 1 to seal.

Inside the case 1 are accommodated a valve body 9, a spring seat 11, a first spring 12, a second spring 13 and a mesh filter 14. The valve body 9 has a conical surface adapted to contact with a valve seat 15 formed on the inner end of the inlet 3.

The spring seat 11 is formed with a blocking portion 17 and a cylindrical portion 16 which correspond to the inner diameter of the mesh filter 14. An O-ring 18 is mounted around the cylindrical portion 16 and a plurality of protrusions 19 are provided around the blocking portion 17. Each protrusion 19 is vertically slidably in contact with the inner periphery of the case 1 so as to position the spring seat 11 as well as to form passages 21 for liquid between the protrusions 19.

Further, the first spring 12 is provided between the upper end of the cylindrical portion 16 and the valve body 9 so as to urge the conical surface of the valve body 9 against the valve seat 15. The spring force of the first spring 12 is so small that it will be compressed by the normal pressure of the liquid supplied into a hose 22.

The mesh filter 14 is in the form of a cylinder having its both ends open, and surrounds the valve seat 9, the first spring 12 and the cylindrical portion 16 of the valve seat 11. Its one end abuts a stepped portion formed around the valve seat 15, and the other end is tightly held around the O-ring 18 mounted around the cylindrical portion 16.

The second spring 13 is provided between the spring seat 11 and the connecting member 4 so as to urge the mesh filter 14 against the valve seat 15. The spring constant of the second spring 13 is set to be larger than that of the first spring 12, so that it will not be compressed by the liquid pressure which acts on the valve body 9. Even if the dimension of the mesh filter 14 varies, the second spring 13 insures that the mesh filter 14 is securely urged to the valve seat 15.

If the variation in dimension of the mesh filter 14 is negligibly small, the second spring 13 can be omitted, and the spring seat 11 can be mounted directly to the inner surface of the case 1, e.g. by screwing.

The connecting portion 2 on one end of the case 1 and the connecting member 4 on the other end are connected with the hose 22 in its halfway. When a liquid is supplied to the hose 22 under a certain pressure, as shown in FIG. 3, the valve body 9 is pushed down against the bias of the first spring 12 and gets away from the valve seat 15. The liquid will flow around the valve body 9, pass the mesh filter 14, and reach the outlet 6 through the passage 21 formed around the spring seat 11.

In the course of the flow, the liquid rapidly flows around the valve body 9 through the narrow space between the valve seat 15 and the valve body 9. Thus, it collides the mesh filter 14 and forcibly remove the dust which is clogging the filter.

What is claimed is:

1. A cleaner for an atomizer comprising a case having an inlet at one end thereof and an outlet at the other end thereof, a conical valve body mounted in said case, a valve seat formed near said inlet, a spring accommodated in said case for urging said valve body against said valve seat, a mesh filter having both ends open and fitted around said valve body and said spring, a spring seat mounted in said case for supporting one end of said spring, said mesh filter having one end thereof abutting said valve seat and the other end blocked by said spring seat, said spring seat being formed with a liquid passage therearound so as to communicate with said outlet.

2. A cleaner for an atomizer as claimed in claim 1 wherein said spring seat has a cylindrical portion and said mesh filter is in the form of a cylinder with one end thereof fitted tightly around an O-ring which is mounted around said cylindrical portion of said spring seat.

* * * * *